United States Patent [19]

Oetiker

[11] Patent Number: 6,116,657

[45] Date of Patent: Sep. 12, 2000

[54] MOUNTING ARRANGEMENT OF PARTIALLY TIGHTENED CLAMP STRUCTURE ON HOSE-LIKE MEMBER

[75] Inventor: Hans Oetiker, Horgen, Switzerland

[73] Assignee: Hans Oetiker AG Maschinen-Und Apparatefabrik, Horgen, Switzerland

[21] Appl. No.: 09/102,800

[22] Filed: Jun. 23, 1998

Related U.S. Application Data

[60] Provisional application No. 60/050,484, Jun. 23, 1997.

[51] Int. Cl.[7] .................................................. F16L 55/00
[52] U.S. Cl. ............................ 285/23; 285/252; 285/330; 285/906
[58] Field of Search .............................. 285/23, 252, 253, 285/236, 243, 245, 330, 906

[56] References Cited

U.S. PATENT DOCUMENTS

| | | | |
|---|---|---|---|
| 3,365,218 | 1/1968 | Denyes | 285/253 |
| 3,407,449 | 10/1968 | Tetzlaff et al. | 285/253 |
| 3,477,106 | 11/1969 | Tetzlaff et al. | 285/253 |
| 4,299,012 | 11/1981 | Oetiker | 285/256 |
| 5,234,233 | 8/1993 | Fix | 285/23 |
| 5,305,499 | 4/1994 | Oetiker | 285/252 |
| 5,388,321 | 2/1995 | Farrell | 285/252 |
| 5,622,391 | 4/1997 | Belik | 285/23 |
| 5,782,499 | 7/1998 | Gfrerer et al. | 285/23 |

FOREIGN PATENT DOCUMENTS

| | | | |
|---|---|---|---|
| 4157285 | 5/1992 | Japan | 285/253 |
| 4191486 | 7/1992 | Japan | 285/253 |

*Primary Examiner*—Dave W. Arola
*Attorney, Agent, or Firm*—Birch, Stewart, Kolasch & Birch, LLP

[57] ABSTRACT

An arrangement for positionally securing a clamp structure on a hose-like member in the partially tightened preassembled condition in which a cut-out is provided in one or on both sides of the clamping band and the hose-like member is provided with knub-like projections of a shape and location complementary to engage in the cut-outs.

10 Claims, 2 Drawing Sheets

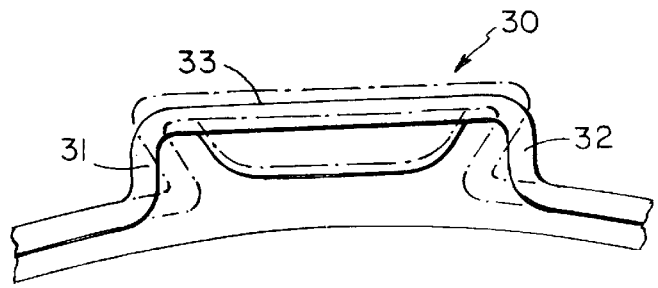
FIG.3
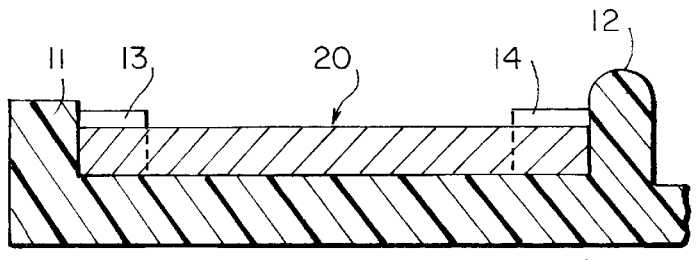
FIG.5
FIG.4
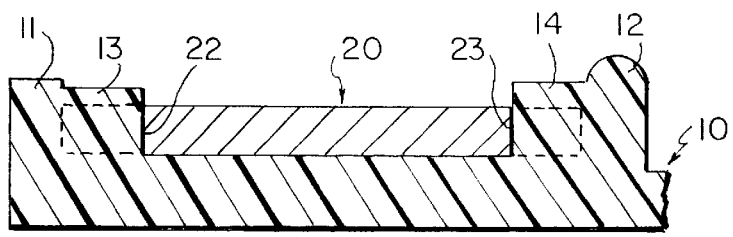
FIG.6
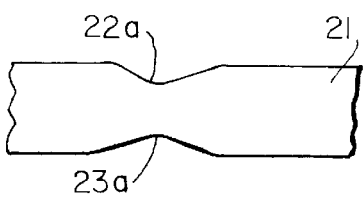
FIG.7
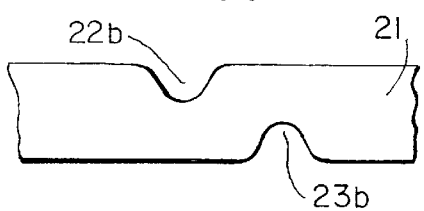
FIG.8
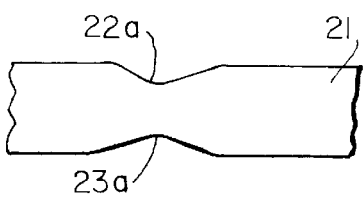
FIG.9
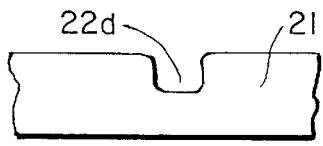
FIG.10
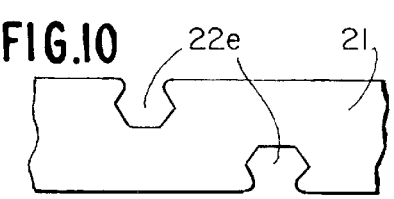

6,116,657

MOUNTING ARRANGEMENT OF PARTIALLY TIGHTENED CLAMP STRUCTURE ON HOSE-LIKE MEMBER

This application claims priority on provisional application Ser. No. 06/050,484 filed on Jun. 23, 1997, the entire contents of which are hereby incorporated by reference.

FIELD OF THE INVENTION

This invention relates to an arrangement for preassembling and mounting a clamp structure on a hose-like member, and more particularly to such an arrangement which, in the partially tightened preassembled condition of the clamp structure, prevents relative movement between the clamp structure and the hose-like member at least in the circumferential direction.

BACKGROUND OF THE INVENTION

There is an ever-increasing demand by industry, in particular by the automobile industry, to supply parts preassembled to the greatest extent possible so as to reduce the work required to manufacture the complete product, such as engines, automobiles, etc. and thereby facilitate automation to reduce manufacturing costs. In the automotive industry, this has led to a demand to supply hose-like parts made from rubber or plastic materials which are to be held fast by means of clamps, with the clamps already preassembled over the hose-like members in such a manner that the clamp structure, though not yet fully tightened, is positionally sufficiently secured already on the hose-like member in a partially tightened condition against relative circumferential and possibly also axial movement and to do so in a simple manner that lends itself to automated mass-production techniques. The aim is to constitute the final assembly of the parts in a more time-saving manner which is possible when the clamp is always in a predetermined position on the hose-like member.

SUMMARY OF THE INVENTION

As solution to the underlying problems, the present invention proposes to provide one or preferably two knub-like projections molded integrally into the hose-like member and so arranged in relation to a clamp structure that the knub-like projections are able to engage in lateral cut-outs provided along the sides of the clamping band. The shape of the cut-outs and of the complementary knub-like projections may be of any desired shape, taking into consideration the need not to excessively weaken the clamping band, and are preferably of more or less rounded-off shape at least at the corners thereof. In a preferred embodiment, these cut-outs as well as the complementary knub-like projections are of more or less half-moon shape or secant-shape and may be provided on mutually opposite sides of the clamping band. However, these cut-outs may also be of more or less polygonal shape, such as triangular, quadrangular, pentagonal, hexagonal, etc., or may be of more or less circular or part-circular shape extending also over more than 180° with the transitions to the sides of the clamping band preferably rounded off. In a particularly preferred embodiment, these cut-outs are provided within the area opposite the tightening device, such as a so-called "Oetiker" ear or the tightening device of a screw-type clamp of any known type. However, the present invention is also possible with any other type of clamp which permits partial tightening. The cut-outs in the clamping band and the knub-like projections in the hose-like member need not be exactly opposite one another but may also be displaced in the circumferential direction, particularly with relatively deep cut-outs so as to lessen any undesired reduction of the width of the clamping band. Additionally, a single cut-out and a single knub-like projection may also be adequate if, in particular, only a relative circumferential movement of the partially tightened clamp and hose-like member is to be prevented and/or the other side of the clamping band is already prevented against axial movement, for example, by a bead in the hose-like member.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 3 is a partial elevational view, on an enlarged scale, illustrating the original and partially tightened condition of the "Oetiker" ear in the clamp structure of FIG. 2;

FIG. 4 is a somewhat schematic cross-sectional view, on an enlarged scale, taken along line 4—4 of FIG. 1;

FIG. 5 is a somewhat schematic cross-sectional view, similar to FIG. 4 and taken along line 5—5 of FIG. 1; and FIGS. 6–10 are partial elevational views, similar to FIG. 1 but on an enlarged scale and illustrating various modified embodiments of the cut-outs in the clamping band, the knub-like projections being then of complementary shape.

DETAILED DESCRIPTION OF THE DRAWINGS

Figure 1:
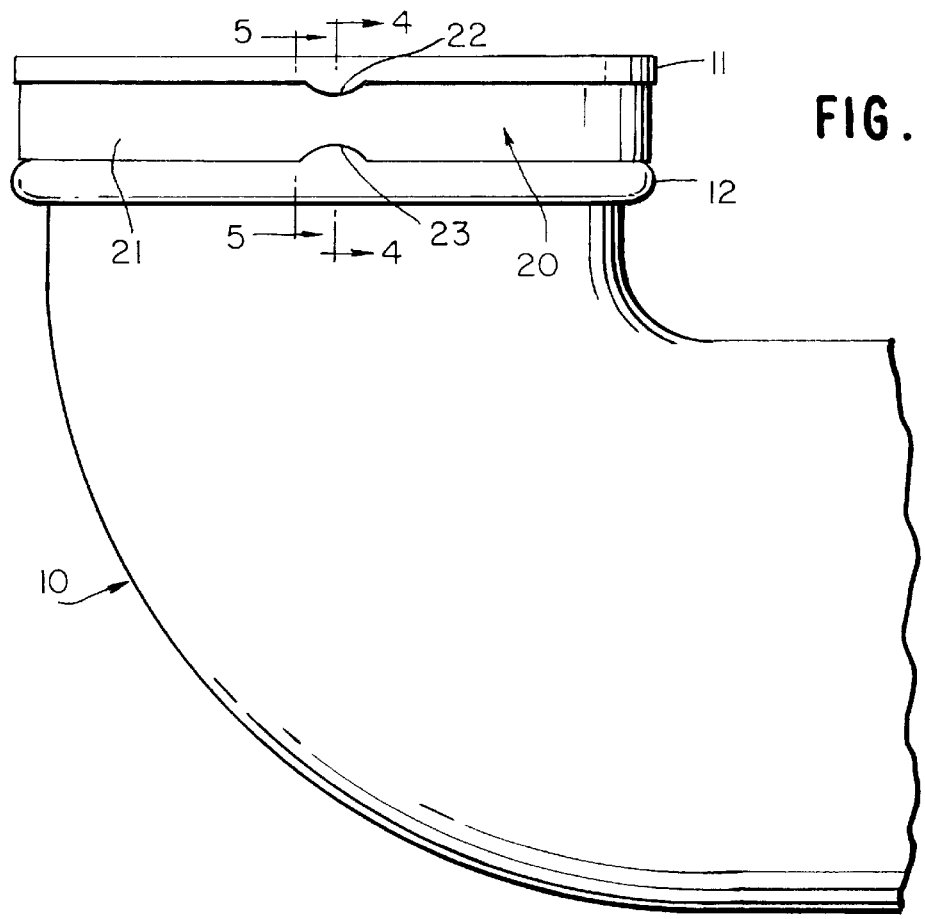
FIG. 1 is a partial elevational view showing one embodiment of an arrangement for the positional securing of a preassembled and partially tightened clamp structure on a hose-like member.
Figure 2:
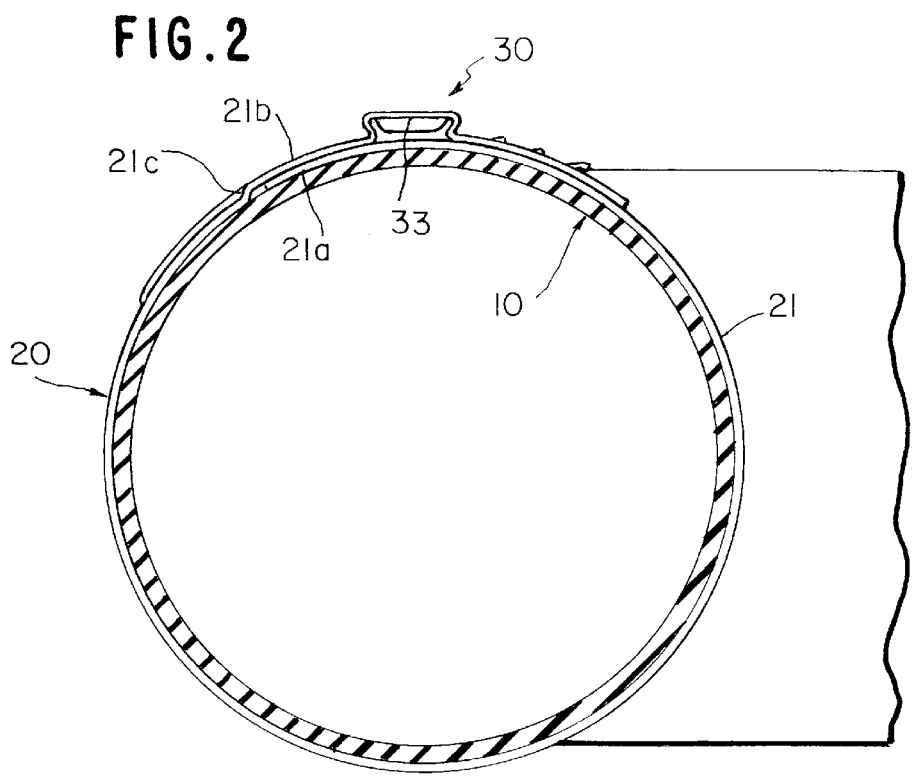
FIG. 2 is a cross-sectional view at right angle to the axis of the arrangement of FIG. 1 using a clamp structure provided with a so-called "Oetiker" ear.

Referring now to the drawing, wherein like reference numerals are used throughout the various views to designate like parts, and more particularly to FIGS. 1–5, reference numeral 10 generally designates a hose-like tubular member of any known type and made from any known suitable material such as rubber or plastic material with a circular cross section. The hose-like member 10 may be a typical hose made, for example, from neoprene or silicon rubber as used in the automotive industry or a bellows made from thin plastic material for covering universal joints or axle parts, for example, in front-wheel drives. A clamp structure generally designated by reference numeral 20 which may be of any known construction that permits partial tightening includes a clamping band 21 made of any known clamping band material such as galvanized steel or stainless steel or even plastic material which is used to hold fast the hose-like member 10 on a relative fixed part, such as a nipple, axle stub, etc. (not shown). In the embodiment of FIGS. 1 to 5, the tightening device includes a typical so-called "Oetiker" ear generally designated by reference numeral 30 (FIG. 2) which consists of two generally outwardly extending leg portions 31 and 32 interconnected by a bridging portion 33 which is preferably provided with a reinforcement, for example, as shown in prior U.S. Pat. No. 4,299,012 or in U.S. Pat. No. 5,305,499. For purposes of partially tightening the preassembled clamp structure on the hose-like member, the ear 30 is partially plastically deformed as shown in dash lines in FIG. 3 which will partially tighten the clamp structure about the hose-like member 10.

According to one embodiment of this invention, the hose-like member 10 is provided with knub-like projections 13 and 14 of a shape complementary to the shape of the cut-outs 22 and 23 provided on opposite sides of the clamping band 21. As shown in FIGS. 4 and 5, the hose-like member 10 which is provided with axially spaced circumferential beads 11 and 12 includes knub-like projections 13 and 14 of a shape complementary to the cut-outs 22 and 23. The knub-like projections 13 and 14 are thereby molded integrally into the hose-like member by the use of an appropriately shaped mold. In the embodiment of FIGS. 1–5, the cut-outs 22 and 23 are located directly opposite one another along the sides of the clamping band 21, preferably within the area opposite the tightening device such as the "Oetiker" ear 30. However, it is also possible to displace the cut-outs 22 and 23 in the circumferential direction by a greater or smaller distance as desired and in that case to locate the knub-like projections 13 and 14 in an analogous manner.

FIGS. 6–10 illustrate modified embodiments for different shapes of the cut-outs whereby the knub-like projections (not shown) would be of complementary shape and location. FIG. 6 illustrates cut-outs 22a and 23a of a more or less triangular shape while FIG. 7 illustrates somewhat deeper cut-outs 22b and 23b of more or less circular configuration which are preferably circumferentially displaced to avoid excessive weakening of the clamping band due to the relatively deeper cut-outs. FIG. 8 illustrates a cut-out 22c of secant-like shape which is provided only along one side of the clamping band. However, the cut-out 22c of FIG. 8 may also be provided on both sides of the clamping band while cut-outs shown in FIGS. 1, 6 and 7 may be provided on only one side. FIG. 9 illustrates a cut-out 22d of more or less rectangular shape while FIG. 10 illustrates cut-outs 22e of more or less pentagonal approaching circular shape. Furthermore, it is also possible to provide two or more cut-outs on one or both sides of the clamping band, it being understood that the number and location of the knub-like projections as well as their shapes should correspond to those of the cut-outs. Additionally, the shape of the cut-outs and knub-like projections may also be modified as known to those skilled in the art, only sharp corners should be avoided for stress elimination in the clamping band and increase in the length of life of the punching die. The clamp 20 in the illustrated embodiment of FIGS. 1 through 5 is of the so-called stepless type in which, as disclosed in the U.S. Pat. No. 4,299,012, a tongue-like extension is provided along the inner band portion 21a extending through an aperture in the outer band portion 21b which is provided within the area of step-like portions 21c. The mechanical connection between overlapping band portions may be of any known type and is constructed in the illustrated embodiment with the use of one guide hook and one or several cold-deformed deep-drawn support hooks as disclosed in the aforementioned U.S. Pat. No. 4,299,012. However, the mechanical connection may also be of the type as disclosed in the U.S. Pat. No. 5,305,499 which includes a combined guide and support hook and one or more deep-drawn support hooks.

The arrangement according to this invention offers numerous advantages. It can be readily automated as the clamp's tightening device will always be in the correct position for engagement by the tightening tool of the robot. It can be readily adapted with only minor modifications in the presently used tools to manufacture the hose-like member and the clamp structure by making minor changes in the mold for the hose-like member to include the knub-like projections and by making minor changes in the punching die for the clamp structure to provide the cut-outs. This is a one-time modification in the mold and the stamping die which can then be used for continued mass production.

It also provides a safety feature as the correct part can be readily identified visually by the particular shape and number of cut-outs and knub-like projections much in the manner of the particular shapes in nipples to prevent incorrect assembly of hoses, for example, in oxygen and nitrogen lines.

Of course, in lieu of two cut-outs in the clamping band and of two knub-like projections of complementary shape in the hose-like member, a single cut-out and a single knub-like projection may also be sufficient, particularly if only relative movement between the clamp structure and the hose-like member in the circumferential direction is to be prevented.

The complementary shape of the knub-like projections is non-critical except in the area of engagement with the cut-outs and may have any suitable configuration. By contrast, the surface of the knub-like projections complementary to the cut-outs should be as parallel as possible and as rectilinear as possible to the cut-out surfaces in the thickness direction of the clamping band for best results. As to the rest, the dimensions of the clamping band and of the hose-like member may be of any known type as known to those skilled in the art.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A two-part preassembly of a hose-like member and of a partially tightened clamp structure on said hose-like member, said partially tightened clamp structure including a clamping band means and a tightening means consisting of a plastically deformable ear means with two outwardly extending leg portions interconnected by a bridging portion, said ear means being already partially plastically deformed and being operable to be fully tightened, the preassembly of the hose-like member and of the partially tightened clamp structure, in which the clamp structure is already sufficiently secured on the hose-like member to maintain its predetermined final position to prevent relative movement therebetween at least in the circumferential direction, being supplied as preassembled parts to reduce the work required to complete the installation of said subassembly on a relatively fixed part to which the hose-like member is to be fastened by subsequent complete tightening of the clamp structure, and complementary engageable means in said clamping band means and in said hose-like member at predetermined locations relative to said ear means for positionally securing said clamp structure in its partially tightened preassembled condition corresponding to its final position on said hose-like member against relative movement between said clamp structure and said hose-like member in the circumferential direction and in at least one axial direction, and said complementary engageable means being located at least along one side of the clamping band means.

2. An arrangement according to claim 1, wherein said complementary engageable means include at least one cut-out in the clamping band means along at least one side thereof and at least one knub-like projection in said hose-like member adapted to engage in said cut-out in a positionally securing manner.

3. An arrangement according to claim 1, wherein said complementary engageable means includes cut-outs on opposite sides of the clamping band and knub-like projections in said hose-like member in corresponding locations to engage with said cut-outs.

4. An arrangement according to claim 3, wherein two cut-outs are located substantially opposite one another along the two sides of the clamping band.

5. An arrangement according to claim 3, wherein said cut-outs and knub-like projections have complementary rounded-off shapes.

6. An arrangement according to claim 5, wherein said shapes are one of half-moon-like shape, of secant-like shape, of at least part-circular shape and of substantially polygonal shape.

7. An arrangement according to claim 1, wherein said bridging portion is provided with reinforcing means.

8. An arrangement according to claim 1, wherein the clamp structure includes overlapping band portions and means mechanically connecting the overlapping band portions.

9. An arrangement according to claim 8, wherein said mechanical connecting means includes at least one guide hook and at least one deep-drawn support hook.

10. An arrangement according to claim 1, wherein said clamp structure is of the stepless type and includes a tongue-like extension at the inner band portion adapted to extend through an opening in a step-like portion of the outer band portion.

\* \* \* \* \*